(No Model.) 2 Sheets—Sheet 2.
R. R. OSGOOD.
FRICTION CLUTCH.
No. 254,233. Patented Feb. 28, 1882.
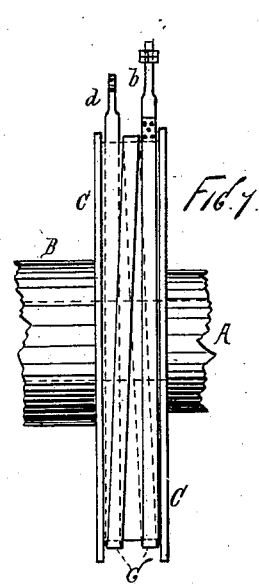
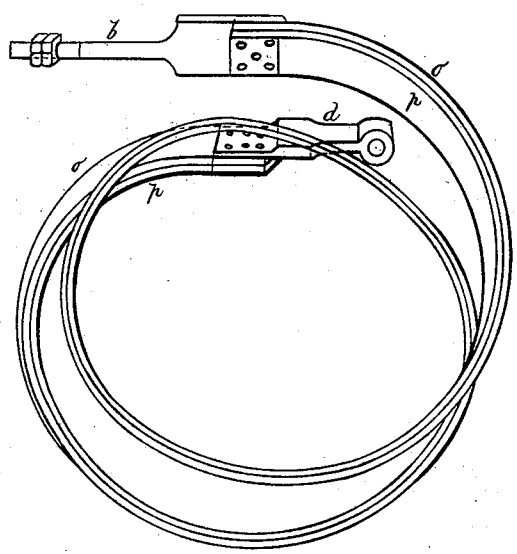
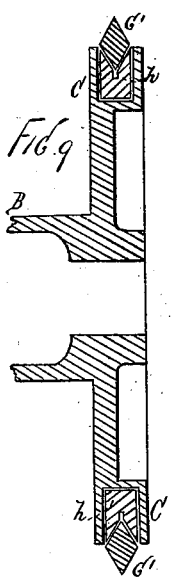
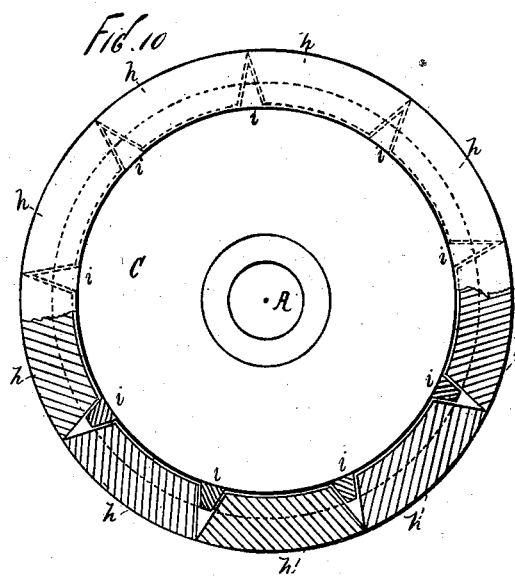
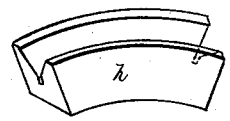
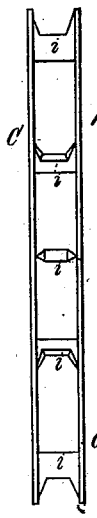
ATTEST:
John Buckler
F. W. Hanaford
Ralph R. Osgood,
INVENTOR
By Worth Osgood,
ATTORNEY

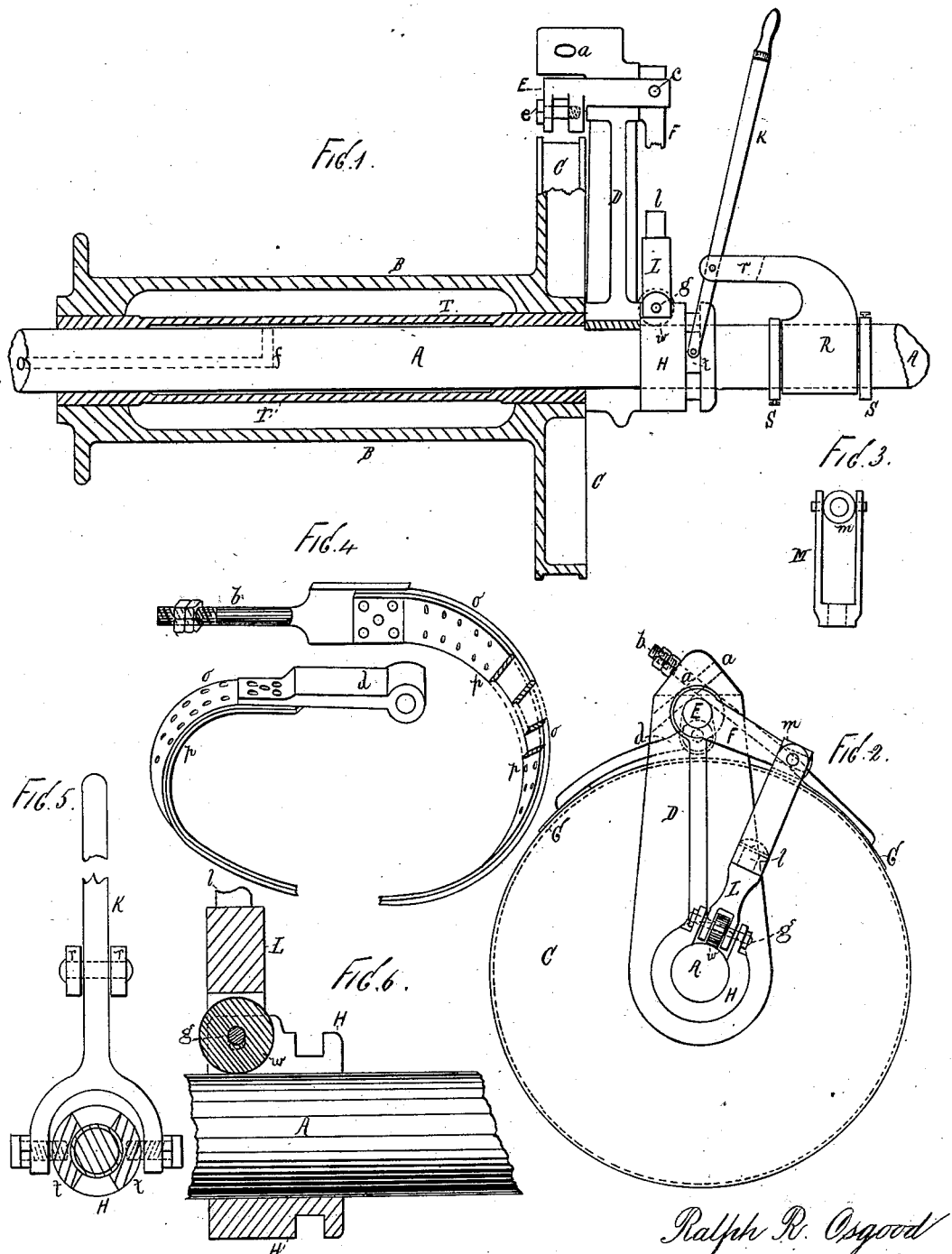

UNITED STATES PATENT OFFICE.

RALPH R. OSGOOD, OF TROY, ASSIGNOR TO OSGOOD & MacNAUGHTON, OF ALBANY, NEW YORK.

FRICTION-CLUTCH.

SPECIFICATION forming part of Letters Patent No. 254,233, dated February 28, 1882.

Application filed December 15, 1881. (No model.)

*To all whom it may concern:*

Be it known that I, RALPH R. OSGOOD, of Troy, county of Rensselaer, and State of New York, have invented certain new and useful Improvements in Friction-Clutches, of which the following is a full, clear, and exact description, reference being had to the accompanying drawings, and to the letters of reference marked thereon.

My invention has relation to that class of clutches designed for coupling a revolving shaft and a drum for a chain, rope, or cable in such manner that the two may be made to revolve together, or the drum may be allowed to remain stationary while the shaft continues in motion. This class of drums is employed for hoisting and lowering, as is well known.

The object of my invention is to produce a compact, durable, and effective clutch which may be easily operated, and instantaneously couple the drum and shaft without danger of slipping, and release the drum with equal facility, when required, without danger of catching, and all this by employment of connections easily and cheaply made, not liable to get out of order, and readily accessible for adjustment. To accomplish all of this my improvements involve certain novel and useful peculiarities of construction, relative arrangements or combinations of parts, and principles of operation, all of which will be herein first fully described, and then pointed out in the claims.

To illustrate the character and scope of my invention, I have chosen a drum especially designed for use as a "backing drum" on a dredging-machine or excavator upon which to apply my improved clutch mechanism; but it should be understood that the improvements are equally applicable upon any form of drum of like general character, and generally for purposes of clutching two shafts, or a shaft and wheel or pulley, or in other mechanical combinations wherein the principles of operation may be found advantageous.

In the accompanying drawings, forming part of this specification, Figure 1 is an axial section and partial elevation of a drum and shaft, showing the location and arrangement of the clutch-shipper and the rocking arm by which the friction-belt is tightened or loosened, the belt and a portion of the rocking crank and connections being omitted to facilitate illustration. Fig. 2 is an end elevation of the drum, showing all the parts of my improved device, except the clutch-shipper, in place upon the shaft. Fig. 3 is an elevation indicating the construction and arrangement of the multiple joint forming one section of the hinged rod which unites the movable clutch-collar and the rocking lever. Fig. 4 is a perspective view, showing the ends of the friction-band and (by broken portions in section) indicating the method of constructing the same. Fig. 5 is an elevation of the clutch-shipper detached from the main parts of the apparatus. Fig. 6 is a sectional view, showing the clutch-collar upon the shaft and the traveling wheel mounted in the collar, the parts being enlarged beyond those shown in Figs. 1 and 2. Fig. 7 is an elevation of the drum-head with the friction-band in place thereon, the band being shown as wrapped more than once around the drum-head; and Fig. 8 is a perspective view of a flat band of length sufficient to be wrapped more than once around the drum-head. Fig. 9 is an axial section through the drum-head, showing wooden blocks placed in the recess provided for them, and showing also the application of an angular friction-band instead of a flat band, as shown in other figures. Fig. 10 is a partial section and elevation of the drum-head upon a plane at right angles to that of Fig. 9, indicating the arrangement of blocks in sections. Fig. 11 is a perspective of one of the blocks having an angular groove cut therein for receiving the friction-belt when made in angular form; and Fig. 12 is an elevation of the drum-head, the blocks being detached therefrom, showing the form of ledges used for securing the blocks in place.

In all these figures like letters of reference, wherever they occur, indicate corresponding parts.

A represents a shaft made to revolve by the application of power, and B the barrel of any form of drum loosely mounted thereon.

It should be understood that for the successful operation of the clutch mechanism it is not essential that the shaft pass through the drum, as represented. The driven shaft and the drum-shaft might be independent of each other. The drum is so connected that it may remain stationary while the shaft A continues to revolve; or it may revolve in an opposite direction, (as when the load is being lowered,) and only revolve with the shaft A when the clutch is brought into operation.

C is the drum-head the periphery of which is channeled for the reception of the friction-band. The greater the diameter of the head the greater will be the leverage of the friction produced thereon to hold the drum. Any size may of course be employed.

Upon shaft A is firmly keyed or otherwise secured a rigid arm, D, of strength sufficient to transmit all required power from the shaft to the drum. The head of arm D projects over the head of the drum and sustains one end of the friction-band in such manner as to make it lead fair with the channel provided for it. The connection between arm D and the band is preferably made by passing the tang $b$ through a perforation, $a$, provided for it. The head of arm D is perforated in two directions, as indicated in Fig. 2, so that the band may be led in either direction desired.

At E is a short powerful lever, journaled in D and made to rock within narrow limits through the medium of its rocking arm or crank F, applied and secured in some substantial manner (as by removable key $c$) to the rocking lever E. One end of the friction-band is firmly secured, as by the eye-piece $d$, through which bolt $e$ is made to pass. The band G, being located and coupled as indicated in Fig. 2, is adjusted to the proper length by means of the nut upon the end of the tang $b$, and this nut should be prevented from slipping by some suitable form of jam or lock. As lever E is rocked toward one side or the other it tightens or loosens the band. The strain brought to bear upon the band determines the amount of friction upon the drum-head and the rigidity of the union thus produced between arm D or the revolving shaft and the drum.

The crank F of lever E is inclined, as indicated in Fig. 2, so that it may be rocked parallel with the face of the drum, in order to secure the desired clamping effects, thus insuring a compact arrangement, by means of which the clutch may be employed in narrow limits, and insuring also an advantage in favor of the rocking power proportional to the degree of inclination. The crank F is connected with the clutch-collar H, which is loosely mounted upon shaft A by a coupling bar or rod, so that as collar H is moved back and forth upon the shaft by the clutch-shipper the end of arm F will be made to approach or recede from the shaft, and thus vary the tension upon the friction-band.

In Fig. 1 the clutch-collar is shown as close up against the base of arm D, or in a position in which the coupling-rod has rocked the lever E to its fullest extent in the direction for clutching. By elevating the hand-lever K the clutch-collar will be drawn back upon the shaft, the end of arm F depressed through the medium of the coupling-rod, and the friction-band loosened. If the band be wound in the opposite direction from that shown in Fig. 2, the reverse effect will be produced by shifting the clutch-collar; but it is preferred that the clutch be so assembled as that it will couple the drum and shaft when the hand-lever K is pulled toward the operator.

The arm F may be inclined toward either side of D.

The coupling-rod is hinged to the clutch-collar, as by the bolt $g$, so that its base may be moved in the direction of the axis of shaft A, and it is necessary that a multiple or universal joint be provided between the clutch-collar H and crank F, in order that required movements may be effected between these peculiarly-located operating parts.

The coupling-rod is composed of two parts, the base part, L, being hinged to clutch-collar H and connected with the other part, M, by an axial stud, $l$, in such manner as to allow M at least a limited movement about the axis of the coupling-rod. The part M is forked, so as to embrace a thimble, $m$, which is journaled in the forks and swiveled upon the end of crank F. These several joints admit of all the desired or required movements, and while they may be modified in point of location and arrangement or particular construction, at least their mechanical equivalents must be employed.

The flat friction-band is composed of a strip of steel, $o$, upon which the tang and eye-piece are mounted, and upon this steel strip I secure a strip of leather, $p$, employing by preference copper rivets for the purpose. The leather forms the bearing-surface of the band.

The hand-lever K is supported by the arms $r\ r$ of the collar R, which is loosely mounted upon the shaft A. The clutch-collar H is recessed to receive the two blocks or segments $t\ t$, connected with the forked arms of lever K by suitable pivots. This constitutes the clutch-shipper, and the collar R is held against movement along shaft A by suitable stops, S S, or their equivalents.

To facilitate movement of the clutch-collar H along shaft A, a traveling wheel, $w$, is mounted therein, preferably upon the bolt $g$, though it might be otherwise mounted. This wheel rides upon the shaft and reduces the power required to move the clutching mechanism, so that the force exerted by the operator will be employed more directly in performing the clutching. It is found that without this traveling wheel a considerable proportion of the power is required to shift the clutch-collar.

I prefer to mount the drum upon a sleeve, T, instead of directly upon the shaft, as is usually done. Between the sleeve T and the shaft is a space for oil, as plainly shown in Fig. 1, which is supplied through the oil-passage $f$. The sleeve turns with the drum, and the oil-passage is provided with an upturned inlet having a suitable cap to prevent waste of oil. (Not shown.) This sleeve and oil-passage have before been known and used.

The belt may be flat or angular. If made flat, I find it advantageous to wrap it around the drum-head twice, substantially as indicated in Fig. 7. By thus wrapping the belt I obtain a more firm gripe upon the drum-head than it is possible to obtain by simply employing the single wrapping, and the belt being properly made will, when the strain thereon is removed, unloose the drum without danger of catching.

The belt might be made to bear directly against the iron or metal of the drum-head; but I prefer to make it bear against a surface of wood. This wooden bearing is composed of blocks $h\ h$, fixed in the periphery of the drum-head. For a flat belt of course the upper surfaces of the blocks are plain, but for an angular belt, as $G'$, a groove is cut in the blocks, as indicated in Figs. 9 and 11.

The ends of the blocks or segments are cut at an angle, as indicated in Fig. 10, and the spaces between adjacent ends accommodate the ledges $i\ i$, formed in or on the periphery of the drum-head. These ledges effectually prevent shipping of the blocks.

The blocks may be easily replaced at any time when found necessary by reason of any wear upon them. They afford an excellent friction-surface, and, being securely located with respect to the drum-head, they contribute largely to the effective results attained.

The clutch mechanism, being arranged and adapted to operate substantially in accordance with the foregoing explanations, occupies but little space, affords a firm and sure gripe upon the drum, requires but little effort on the part of the operator to clutch or unclutch, and withal admirably answers the several purposes and objects of the invention, as previously stated.

Having now fully described my invention, what I claim as new therein, and desire to secure by Letters Patent, is—

1. In a friction-clutch, a rocking lever connected with the friction-band, said lever being mounted in an arm keyed to the revolving shaft and provided with a crank, inclined as explained, a clutch-shipper mounted upon the revolving shaft and movable in the direction of the length thereof, and a connecting-rod having multiple joints, the several parts being combined and arranged to operate substantially as explained.

2. The clutch-collar movable in the direction of the axis of the shaft, a jointed connecting-rod hinged at its base to the clutch-collar and at the opposite end swiveled upon the crank of the rocking lever, the crank movable parallel with the face of the drum, the several parts being combined and arranged to operate substantially as shown and described.

3. In combination with the crank which controls the rocking lever, the thimble mounted thereon and journaled in the forked section of the coupling-rod, the base-section of said rod being hinged to the clutch-collar, substantially as and for the purposes set forth.

4. In a friction-clutch, the combination, with the clutch-collar made movable back and forth upon the shaft, of a traveling wheel mounted in said collar and bearing upon the shaft, substantially as and for the purposes set forth.

5. In combination with the drum-head, the wooden segments or blocks forming bearing-surfaces for the band, the same being held in place by and bearing against the ledges formed in or on the drum-head, substantially as shown and described.

6. The herein-described wooden blocks or segments forming the bearing surface for the band, the same being held in place by the ledges formed in or on the drum-head and grooved for the reception of an angular band, substantially as and for the purposes set forth.

In testimony that I claim the foregoing I have hereunto set my hand in the presence of two witnesses.

RALPH R. OSGOOD.

Witnesses:
WORTH OSGOOD,
F. W. HANAFORD.